United States Patent
Takeda et al.

(10) Patent No.: US 11,678,223 B2
(45) Date of Patent: Jun. 13, 2023

(54) TRANSMISSION POWER CONTROL COMMAND ACCUMULATION FOR NR-DUAL CONNECTIVITY

(71) Applicant: QUALCOMM Incorporated, San Diego, CA (US)

(72) Inventors: Kazuki Takeda, Tokyo (JP); Seyedkianoush Hosseini, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/204,173

(22) Filed: Mar. 17, 2021

(65) Prior Publication Data

US 2021/0337427 A1    Oct. 28, 2021

Related U.S. Application Data

(60) Provisional application No. 63/016,671, filed on Apr. 28, 2020.

(51) Int. Cl.
*H04W 72/04* (2023.01)
*H04W 28/06* (2009.01)
*H04W 52/14* (2009.01)
*H04W 72/0446* (2023.01)
*H04W 72/23* (2023.01)
*H04W 84/18* (2009.01)

(52) U.S. Cl.
CPC ......... *H04W 28/06* (2013.01); *H04W 52/146* (2013.01); *H04W 72/0446* (2013.01); *H04W 72/23* (2023.01); *H04W 84/18* (2013.01)

(58) Field of Classification Search
CPC . H04W 24/10; H04W 28/06; H04W 28/0236; H04W 52/244; H04W 52/146; H04W 36/0094; H04W 72/042; H04W 72/0446; H04W 72/14; H04L 5/0048; H04L 5/004
See application file for complete search history.

(56) References Cited

U.S. PATENT DOCUMENTS

| | | | |
|---|---|---|---|
| 9,226,290 B2 | 12/2015 | Gaal et al. | |
| 10,588,036 B2* | 3/2020 | Sadeghi | ............... H04W 24/10 |
| 2011/0134774 A1* | 6/2011 | Pelletier | .............. H04W 72/042 |
| | | | 370/242 |
| 2012/0113866 A1* | 5/2012 | Tenny | ................... H04W 24/10 |
| | | | 370/254 |

* cited by examiner

*Primary Examiner* — Wei Zhao

(57) ABSTRACT

A configuration to enable a UE to discard a TPC command for the MCG if there is an overlapping SCG transmission. The apparatus determines that a first PUSCH transmission to an SCG is scheduled to be at least partially concurrent in time with a second PUSCH transmission to a MCG. The apparatus determines whether to receive a TPC command associated with the transmission of the second PUSCH. The apparatus determines whether to discard the TPC command based on when the TPC command is received.

27 Claims, 10 Drawing Sheets

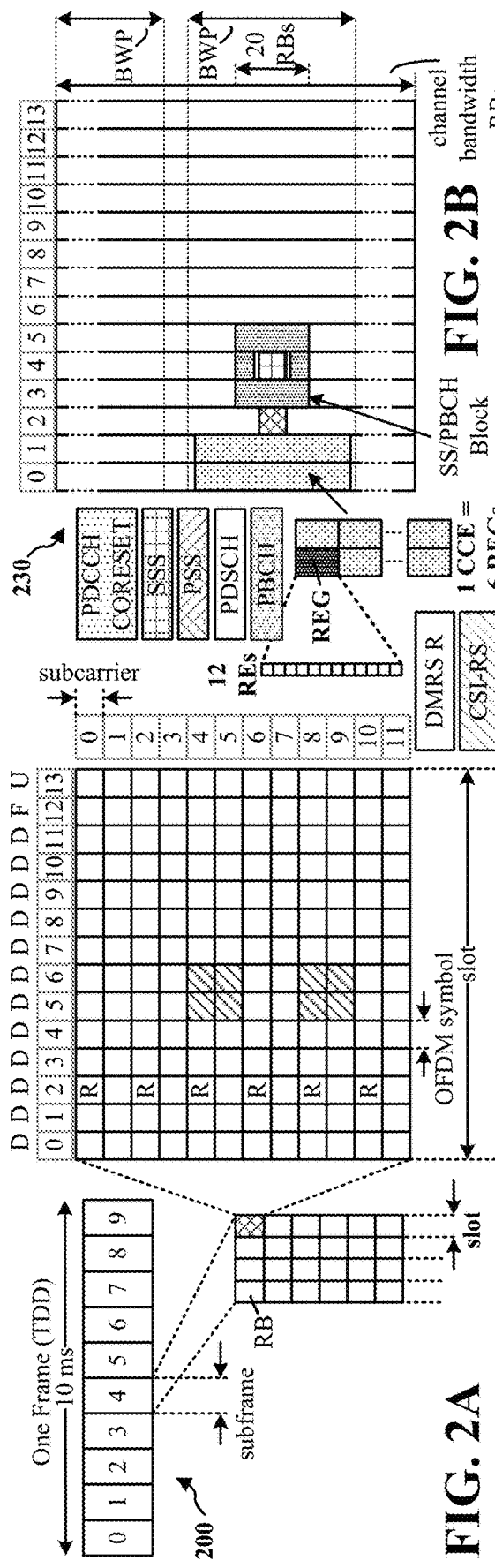
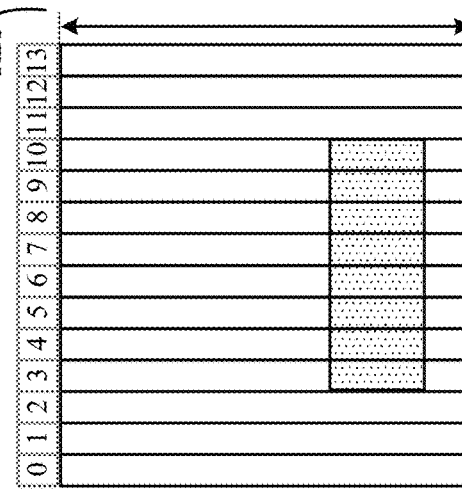
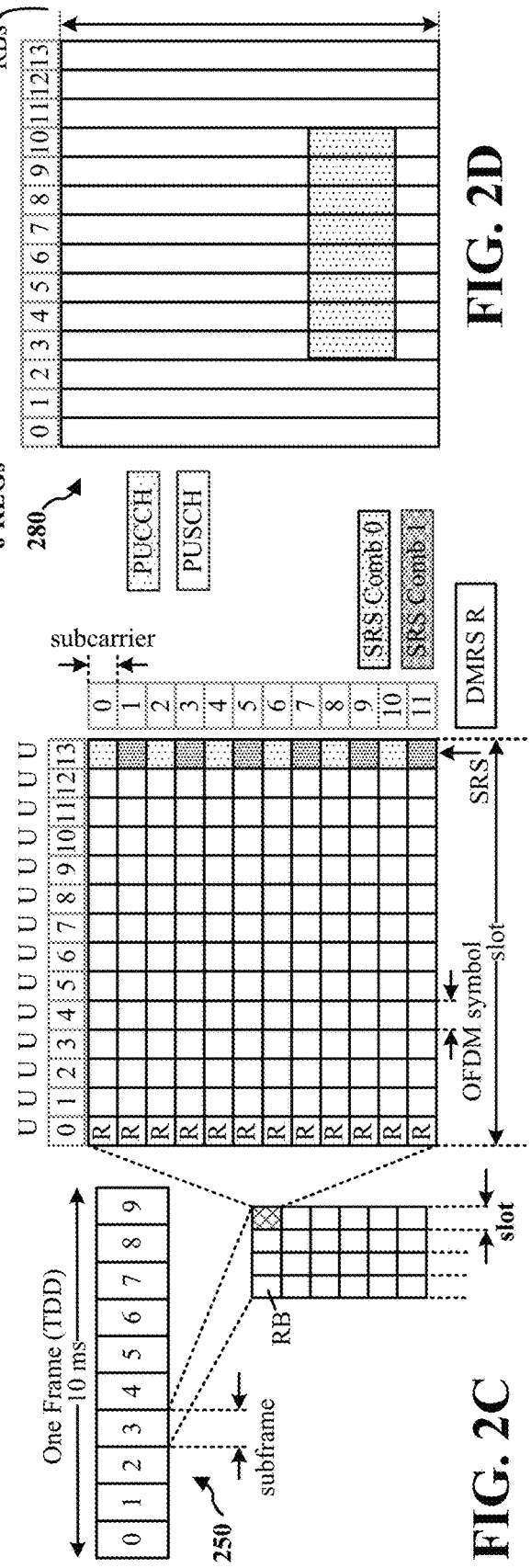
FIG. 2A  FIG. 2B  FIG. 2C  FIG. 2D

TRANSMISSION POWER CONTROL COMMAND ACCUMULATION FOR NR-DUAL CONNECTIVITY

CROSS REFERENCE TO RELATED APPLICATION(S)

This application claims the benefit of U.S. Provisional Application Ser. No. 63/016,671, entitled "Transmission Power Control Command Accumulation for NR-Dual Connectivity" and filed on Apr. 28, 2020, which is expressly incorporated by reference herein in its entirety.

BACKGROUND

Technical Field

The present disclosure relates generally to communication systems, and more particularly, to a configuration for transmission power control (TPC) command accumulation in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus determines that a first physical uplink shared channel (PUSCH) transmission to a secondary cell group (SCG) is scheduled to be at least partially concurrent in time with a second PUSCH transmission to a master cell group (MCG). The apparatus determines whether to receive a transmission power control (TPC) command associated with the transmission of the second PUSCH. The apparatus determines whether to discard the TPC command based on when the TPC command is received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
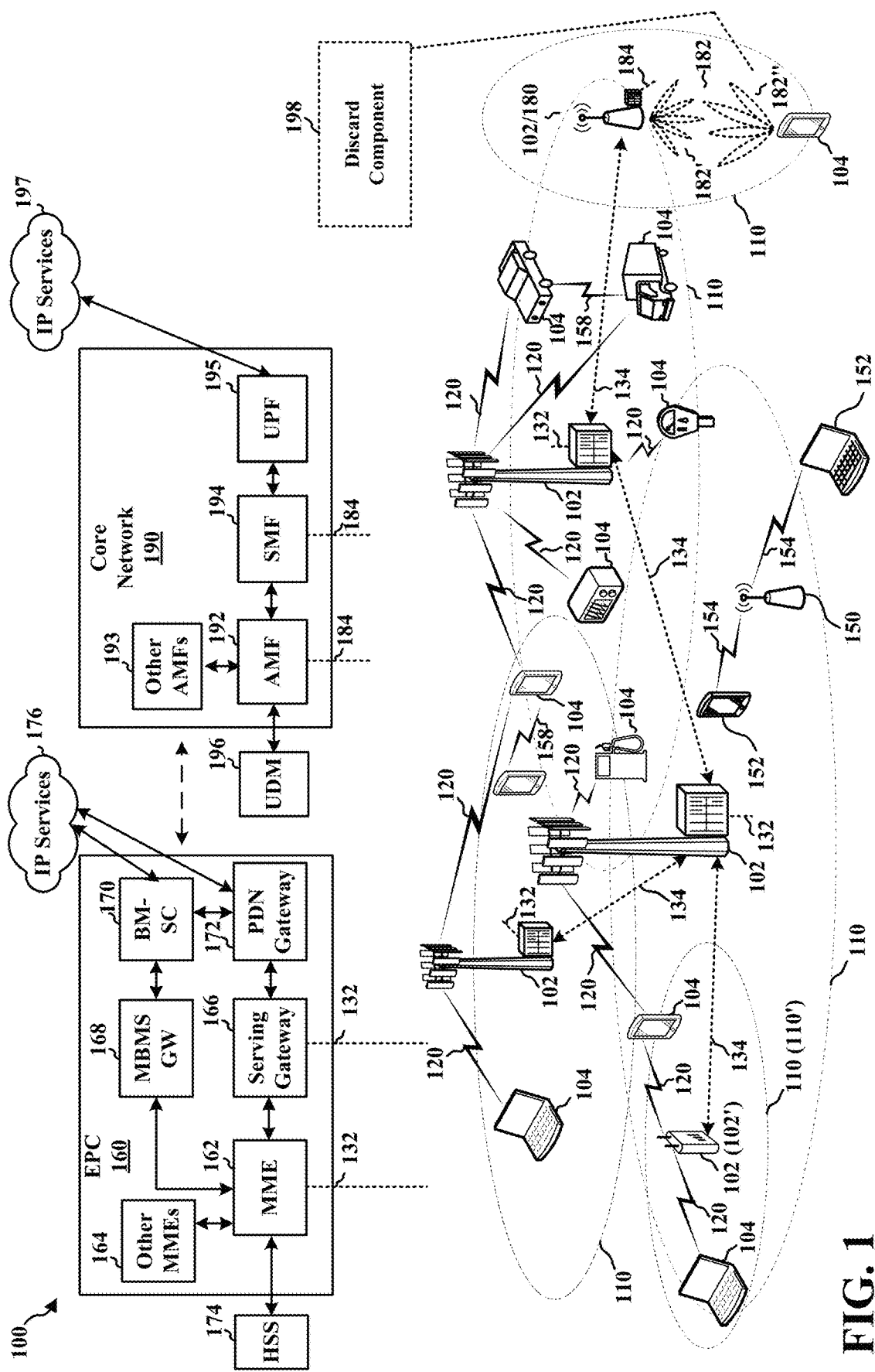
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to discard a TPC command for the MCG if there is a potential overlapping SCG transmission (e.g., if the UE is configured with NR-DC dual connectivity in which at least one MCG cell(s) and at least one SCG cell(s) are in the same frequency range (FR), which requires power-sharing between MCG cell(s) and SCG cell(s). For example, the UE 104 of FIG. 1 may include a discard component 198 configured to determine whether to discard a TPC command based on when the TPC command is received. The UE 104 may determine that a first PUSCH transmission to a SCG may be scheduled to be at least partially concurrent in time with a second PUSCH transmission to an MCG. The UE 104 may determine whether to receive a TPC command associated with the transmission of the second PUSCH. The UE 104 may determine whether to discard the TPC command based on when the TPC command is received.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2 g slots/subframe. The subcarrier spacing and symbol length/duration are a function of the numerology. The subcarrier spacing may be equal to $2^\mu * 15$ kHz, where µ is the numerology 0 to 4. As such, the numerology µ=0 has a subcarrier spacing of 15 kHz and the numerology µ=4 has subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
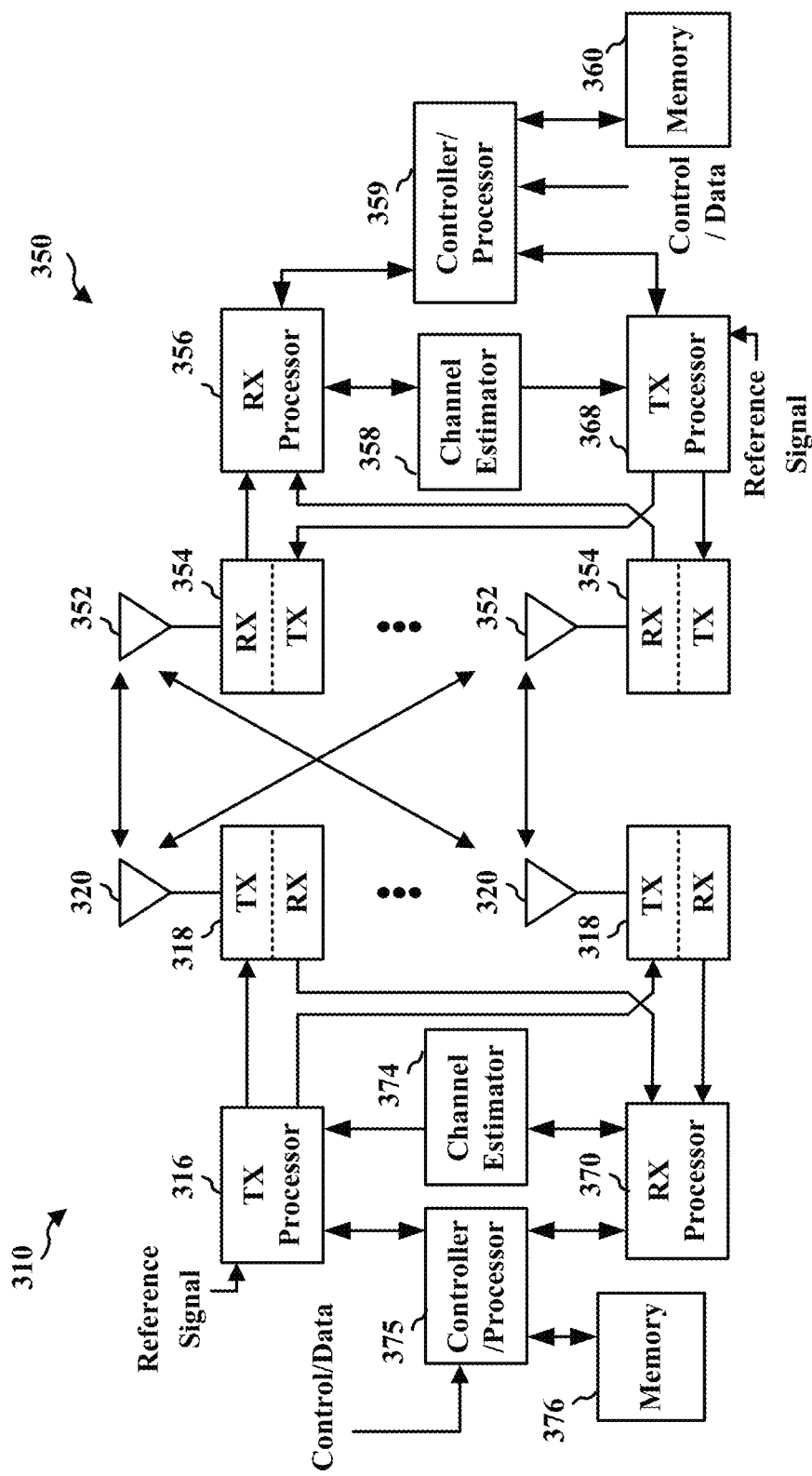
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
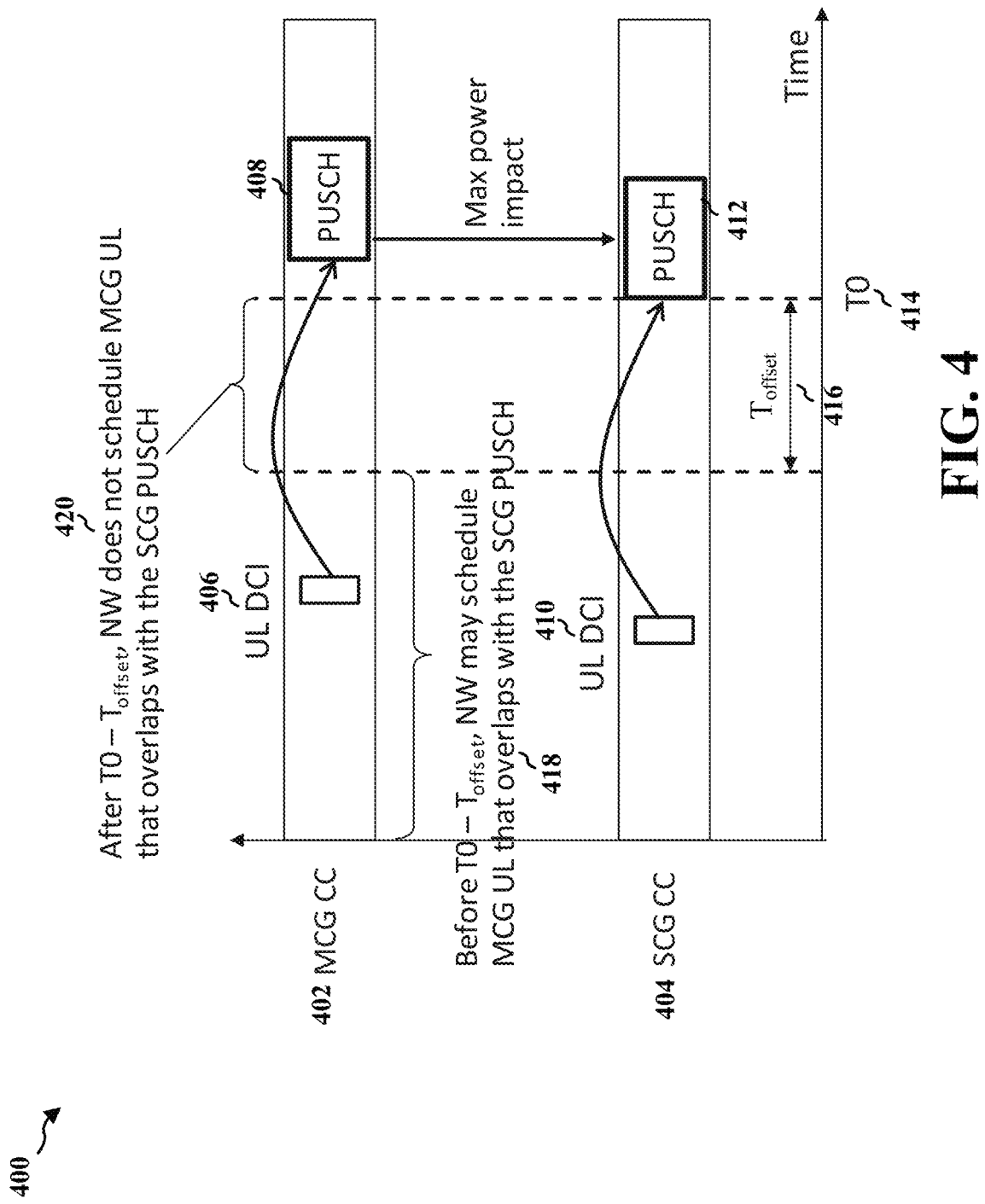
FIG. 4 is a diagram illustrating dynamic power sharing for NR-DC.

FIG. 4 is a diagram illustrating a wireless network 400 operating in a dynamic power sharing configuration. Wireless networks may be configured to operate in a dynamic power sharing configuration, such as in NR-DC. Dynamic power sharing allows a UE to split its uplink power between an MCG and an SCG based on the DCI. In some instances, such as for an uplink transmission from the UE to an MCG, the SCG transmission may not impact an uplink power control for the transmission with the MCG. In some instances, such as for an uplink transmission from the UE to the SCG, a maximum sum power for the uplink transmission from the UE to the SCG may comprise the minimum between the PSCG, and the total power ($P_{total}$) minus the MCG transmission power. The MCG transmission power may be calculated based on the MCG DCIs until T0 414 minus a time offset ($T_{offset}$) 416. After time T0 414−$T_{offset}$ 416, the network may not schedule an uplink transmission with the MCG that overlaps with the SCG uplink transmission that starts at time T0 414, as shown for example at 420 of FIG. 4. However, before the time T0 414−$T_{offset}$ 416, the network may schedule an uplink transmission with the MCG that overlaps with the SCG uplink transmission (e.g., SCG PUSCH), as shown for example at 418 of FIG. 4. With this understanding, for determining the available transmission power for the SCG uplink transmission, the UE may take into account the scheduling DCIs for MCG that may be received before T0−$T_{offset}$.

For inter-cell groups, the sum power exchange may be one direction, for example from MCG to SCG. For an SCG uplink transmission, the maximum power may not be impacted after the deadline of (T0 414−$T_{offset}$ 416). There may not be a need to update the SCG maximum power during the middle of an uplink transmission for the SCG. In both the MCG and SCG, uplink carrier aggregation prioritization rule may be reused.

The value of $T_{offset}$ may be reported to the network, by the UE, as a capability (e.g., value 1 or value 2). For example, value 1 may indicate that the maximum possible value amongst any minimum UE processing time across all the serving cells in the MCG and/or the SCG. For example, value 2 may indicate that the maximum possible value amongst any minimum UE processing time, except for $T_{proc,CSI}^{mux}$, across all the serving cells in the MCG and/or the SCG.

In some instances, the UE may be configured with a UE-group TPC command in DCI format 2_2 or 2_3. The TPC command may be carried by a DCI format 2_2 or 2_3 which may not schedule an uplink transmission. The TPC command application timing for dynamic PUSCH scheduled by a DCI may be based on a K2 value indicated by the DCI. The TPC command application timing for PUCCH for HARQ-ACK for a PDSCH may be based on a K1 value indicated by the DCI. The TPC command application timing for a configured grant PUSCH may be based on a minimum K2 value configured by a PUSCH-ConfigCommon. The TPC command application timing for a PUCCH for a periodic CSI or a periodic SRS may also be based on the minimum K2 value configured by a PUSCH-ConfigCommon.

Figure 5:
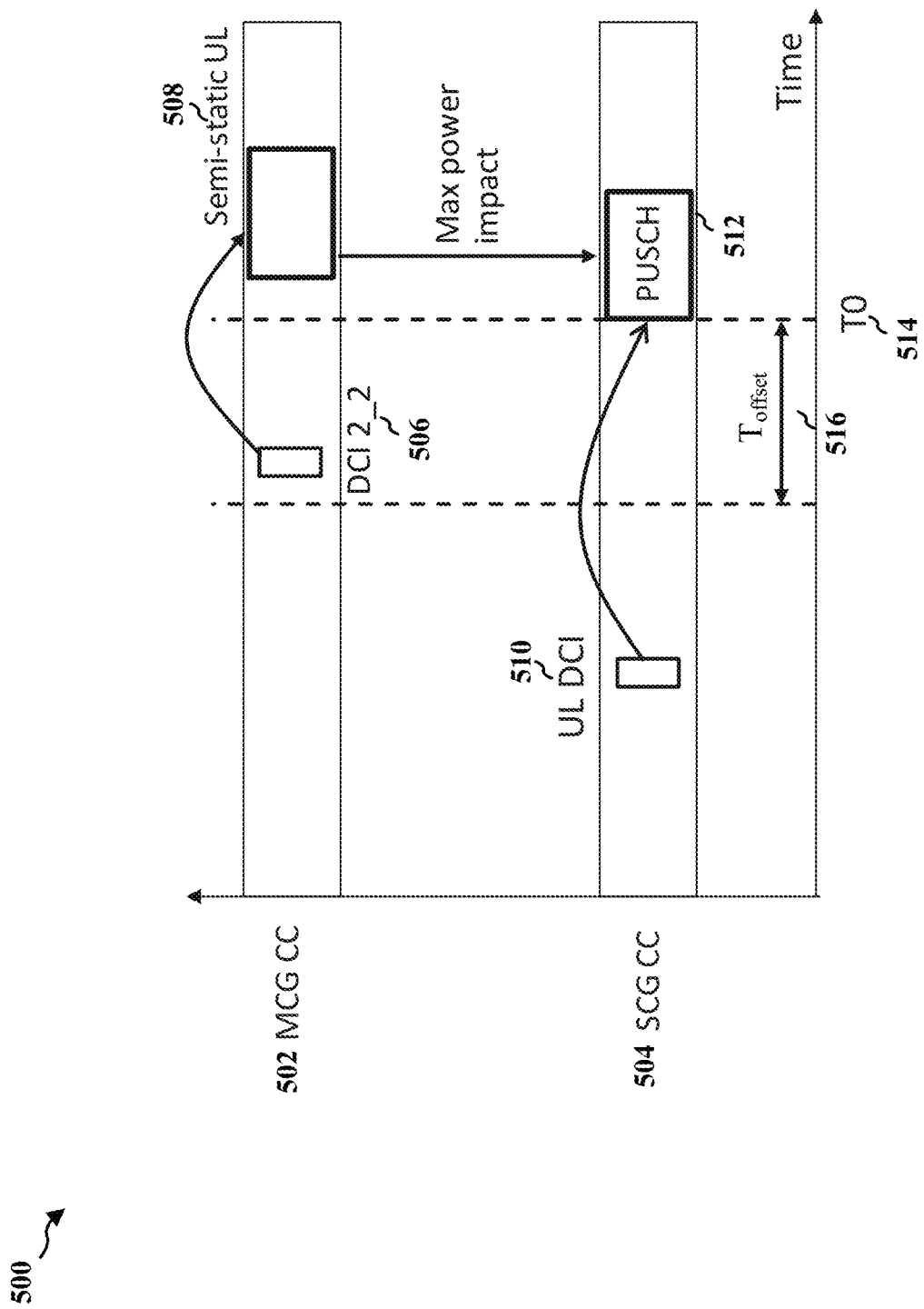
FIG. 5 is a diagram illustrating a TPC command for semi-static uplink transmission.

FIG. 5 is a diagram 500 illustrating a TPC command for a semi-static uplink transmission. In some instances, such as a UE-group TPC command, it is possible for the DCI 506 (e.g., DCI format 2_2 or DCI format 2_3) to be received after T0 514−$T_{offset}$ 516 on the MCG 502 for a semi-static uplink transmission 508. If the TPC command received in DCI 506 is applied to the MCG semi-static transmission, then the MCG uplink may have more power than the SCG 504 expects. In order to ensure that the UE uplink power is properly distributed between the MCG and the SCG, the UE may be configured to discard the TPC command for the MCG. The UE may be configured to determine whether and/or when there is an overlapping SCG transmission.

The aspects present herein are directed to improving the manner in which uplink power between an MCG and an SCG is properly shared, such that the MCG and SCG may operate in a dynamic sharing configuration. Dynamic power sharing configuration may enable a UE to distribute the uplink power between the MCG and SCG based on the DCI configuration received from the MCG and SCG. Dynamic power sharing may be impacted based on when the UE receives the TPC, such that the ability for UEs to determine whether to receive TPC commands and/or discard TPC commands if received during certain time frames or periods may be desirable. As such, discarding TPC commands based on when the TPC commands were received by the UE may allow for a more efficient utilization of resources.

To determine if the TPC command for the MCG should be discarded, the UE may be configured to determine whether and/or when there is an overlapping SCG uplink transmission.

Figure 6:
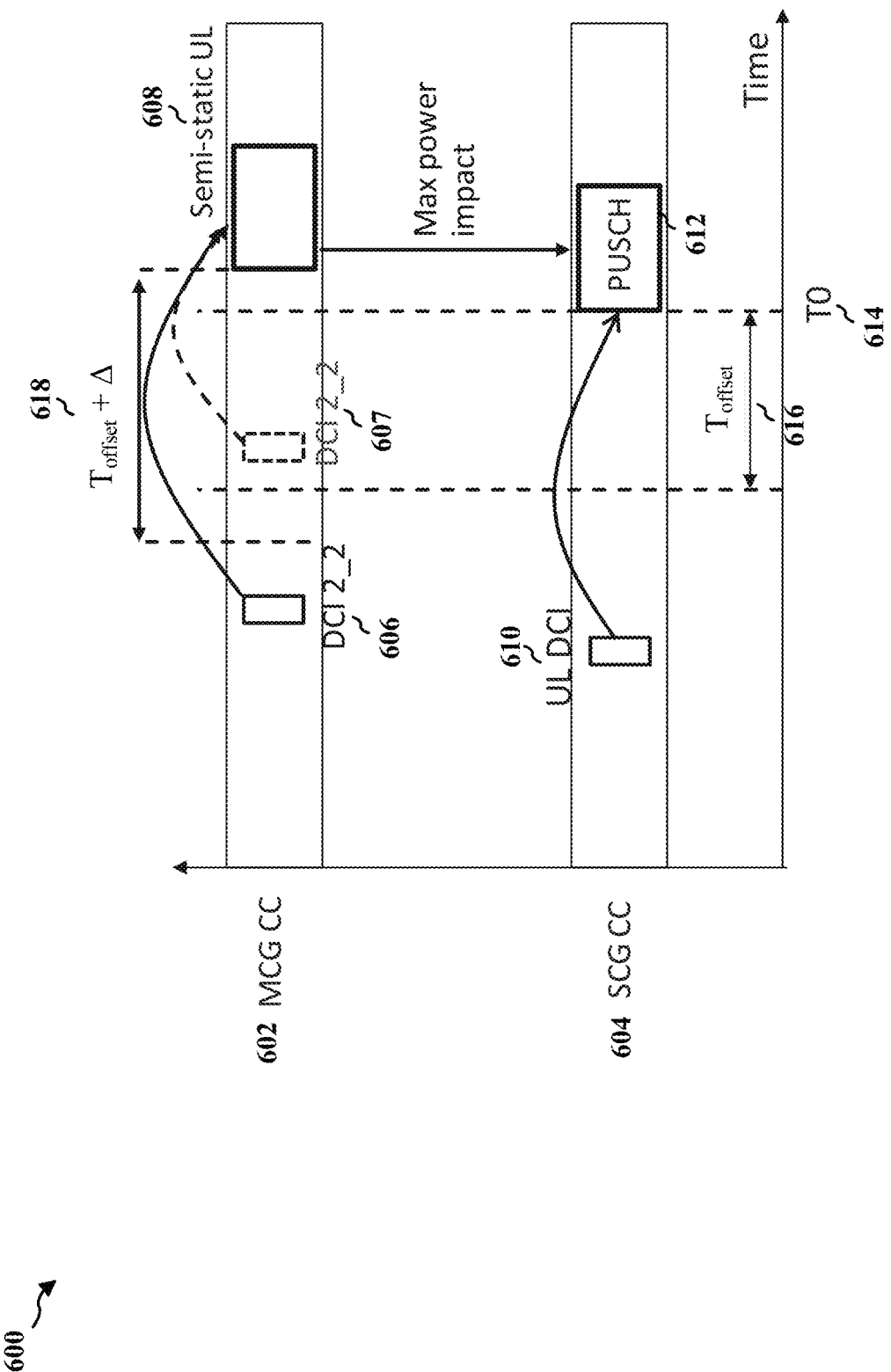
FIG. 6 is a diagram illustrating a TPC command for semi-static uplink transmission.

FIG. 6 is a diagram 600 illustrating a TPC command for semi-static uplink transmission. The diagram 600 includes an MCG 602 and an SCG 604. The UE (not shown) may receive a DCI (e.g., 606, 607). The DCI may include a TPC command for the uplink transmission of the PUSCH from the UE to the MCG. As discussed above, the network should not schedule an uplink transmission for the MCG that overlaps with an uplink transmission for the SCG between the time T0 614–$T_{offset}$ 616. For example, DCI 606 is received by the UE outside of the time frame T0 614–$T_{offset}$ 616, and may not result in scheduling overlapping uplink transmissions between the MCG and SCG.

The time T0 614 is measured with respect to the start of the PUSCH 612 transmission, while $T_{offset}$ 616 defines an offset time from the time T0 614, such that the time frame of T0 614–$T_{offset}$ 616 prior to the transmission of the SCG PUSCH 612 is the time frame where the MCG should not schedule an uplink transmission for the MCG. For example, the DCI 607 in FIG. 6 is shown as being received by the UE (not shown) between the time frame of T0 614–$T_{offset}$ 616, which may result in scheduling an uplink MCG that overlaps with an uplink SCG. Taking into account the DCI 607 received during the time frame of T0 614–$T_{offset}$ 616 may result in incorrect power sharing between the MCG and the SCG. As such, discarding DCI 607 may allow for efficient use of the shared power between the MCG and SCG. In addition, the diagram 600 of FIG. 6 includes another range time that is based on the start of the uplink transmission of the MCG. For example, range time $T_{offset}+\Delta$ 618 defines an additional range of time where the network should not schedule an uplink MCG, in order to avoid scheduling an uplink MCG transmission that overlaps with an uplink SCG transmission. Including a range of time based on the start of the uplink MCG transmission, may further assist in properly sharing the power between the MCG and SCG. With reference again to FIG. 6, the DCI 607 may be received by the UE (not shown) within the time range of $T_{offset}+\Delta$ 618. In such instances, the UE may determine to discard the TPC of DCI 607 since the DCI 607 was received in the time range of $T_{offset}+\Delta$ 618. The $T_{offset}$ may be associated with a maximum of minimum processing times of the UE, while the $\Delta$ may be a number of symbols as a function of a subcarrier spacing for the transmission of the PUSCH for the MCG. The time range of $T_{offset}+\Delta$ 618 may provide an increased time frame than T0 614–$T_{offset}$ 616 due, in part, to the time range $T_{offset}+\Delta$ 618 being associated with the start of the semi-static uplink transmission 608, instead of T0 614. The DCI 606, as shown in FIG. 6, is shown as also being outside of the time range $T_{offset}+\Delta$ 618, such that the DCI 606 may not result in scheduling overlapping uplink transmissions between the MCG and SCG. The DCI 606 may be utilized for determining the power control of the MCG. In some aspects, the discarded DCI (e.g., DCI 607) is not included in determining the power control of the MCG with the associated PUSCH transmission, but the discarded DCI may be included in determining the power control of the MCG in subsequent PUSCH transmissions.

Figure 7:
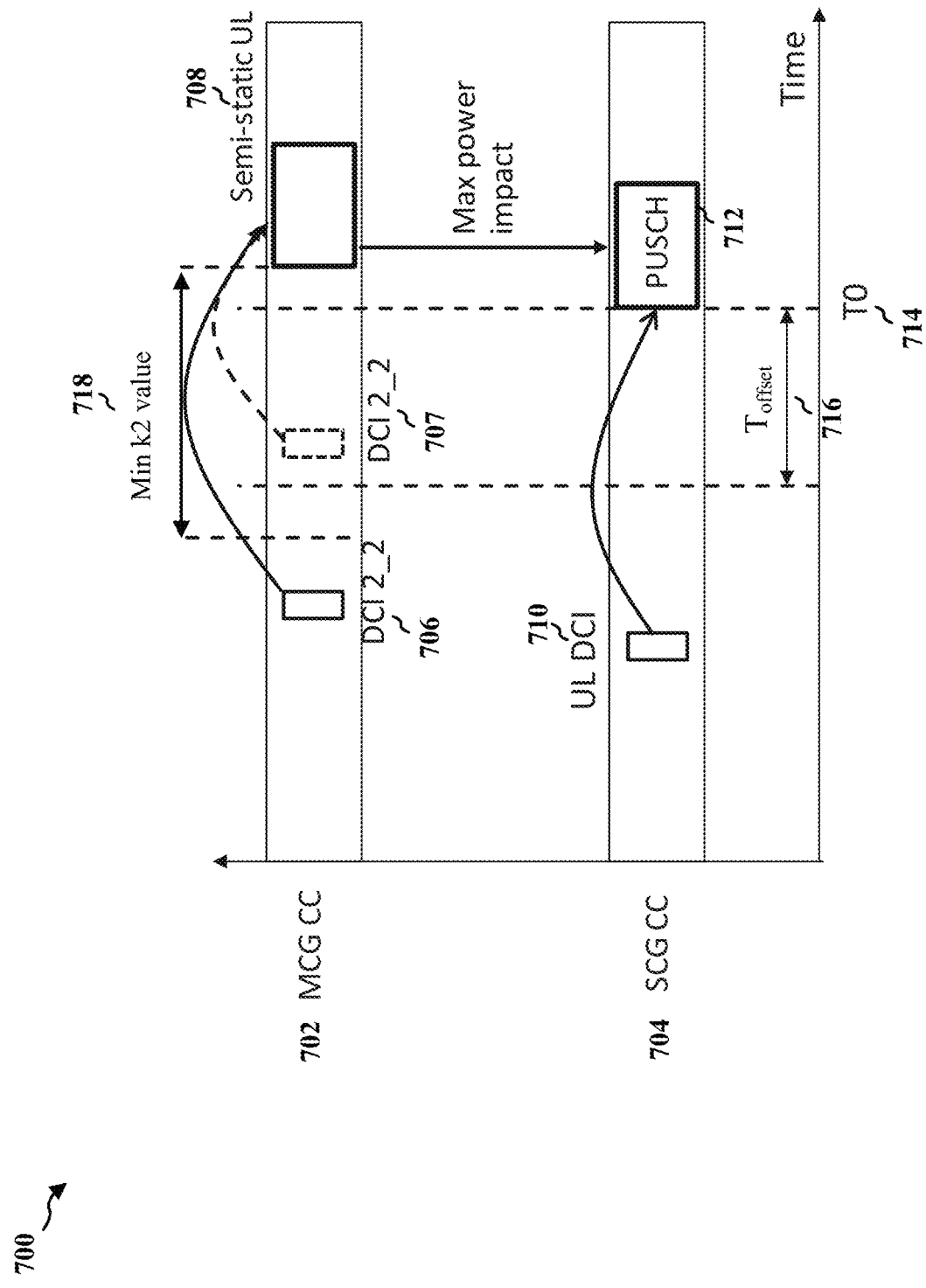
FIG. 7 is a diagram illustrating a TPC command for semi-static uplink transmission.

FIG. 7 is a diagram 700 illustrating a TPC command for semi-static uplink transmission. The diagram 700 includes an MCG 702 and an SCG 704. The UE (not shown) may receive a DCI (e.g., 706, 707). The DCI may include a TPC command for the uplink transmission of the PUSCH from the UE to the MCG. As discussed above, the network should not schedule an uplink transmission for the MCG that overlaps with an uplink transmission for the SCG between the time T0 714–$T_{offset}$ 716. For example, DCI 706 may be received by the UE outside of the time frame T0 714–$T_{offset}$ 716, and may not result in scheduling overlapping uplink transmissions between the MCG and SCG.

The time T0 714, as discussed above for time T0 614, is measured with respect to the start of the PUSCH 712 transmission, while $T_{offset}$ 716 defines an offset time from the time T0 714, such that the time frame of T0 714–$T_{offset}$ 716 prior to the transmission of the SCG PUSCH 712 is the time frame where the MCG should not schedule an uplink transmission for the MCG. For example, the DCI 707 in FIG. 7 is shown as being received by the UE (not shown) between the time frame of T0 714–$T_{offset}$ 716, which may result in scheduling an uplink MCG that overlaps with an uplink SCG. Taking into account the DCI 707 received during the time frame of T0 714–$T_{offset}$ 716 may result in incorrect power sharing between the MCG and the SCG. As such, discarding DCI 707 may allow for efficient use of the shared power between the MCG and SCG. In addition, the diagram 700 of FIG. 7 includes another range time that may be based on the start of the uplink transmission 708 of the MCG. For example, a minimum k2 value 718 defines an additional range of time where the network should not schedule an uplink MCG, in order to avoid scheduling an uplink MCG transmission that overlaps with an uplink SCG transmission. Including a range of time based on the start of the uplink MCG transmission 708, may further assist in properly sharing the power between the MCG and SCG. With reference again to FIG. 7, the DCI 707 may be received by the UE (not shown) within the time range of $T_{offset}+\Delta$ 718. In such instances, the UE may determine to discard the TPC of DCI 707 since the DCI 707 was received in the time range of $T_{offset}+\Delta$ 718. The $T_{offset}$ may be associated with a maximum of minimum processing times of the UE, while the $\Delta$ may be a number of symbols as a function of a subcarrier spacing for the transmission of the PUSCH for the MCG. The time range of the minimum k2 value 718 may provide an increased time frame than T0 714–$T_{offset}$ 716 due, in part, to the time range of the minimum k2 value 718 being associated with the start of the semi-static uplink transmission 708, instead of T0 714. The minimum k2 value 718 may be configured by a UE specific PUSCH configuration. The minimum k2 value 718 may be a minimum number of slots between a DCI and a PUSCH transmission configured in a PUSCH time domain resource allocation in the UE specific PUSCH configuration. The DCI 706, as shown in FIG. 7, is shown as also being outside of the range minimum k2 value 718, such that the DCI 706 may not result in scheduling overlapping uplink transmissions between the MCG and SCG. The DCI 706 may be utilized for determining the power control of the MCG. In some aspects, the discarded DCI (e.g., DCI 707) is not included in determining the power control of the MCG with the associated PUSCH transmission, but the discarded DCI may be included in determining the power control of the MCG in subsequent PUSCH transmissions.

Figure 8:
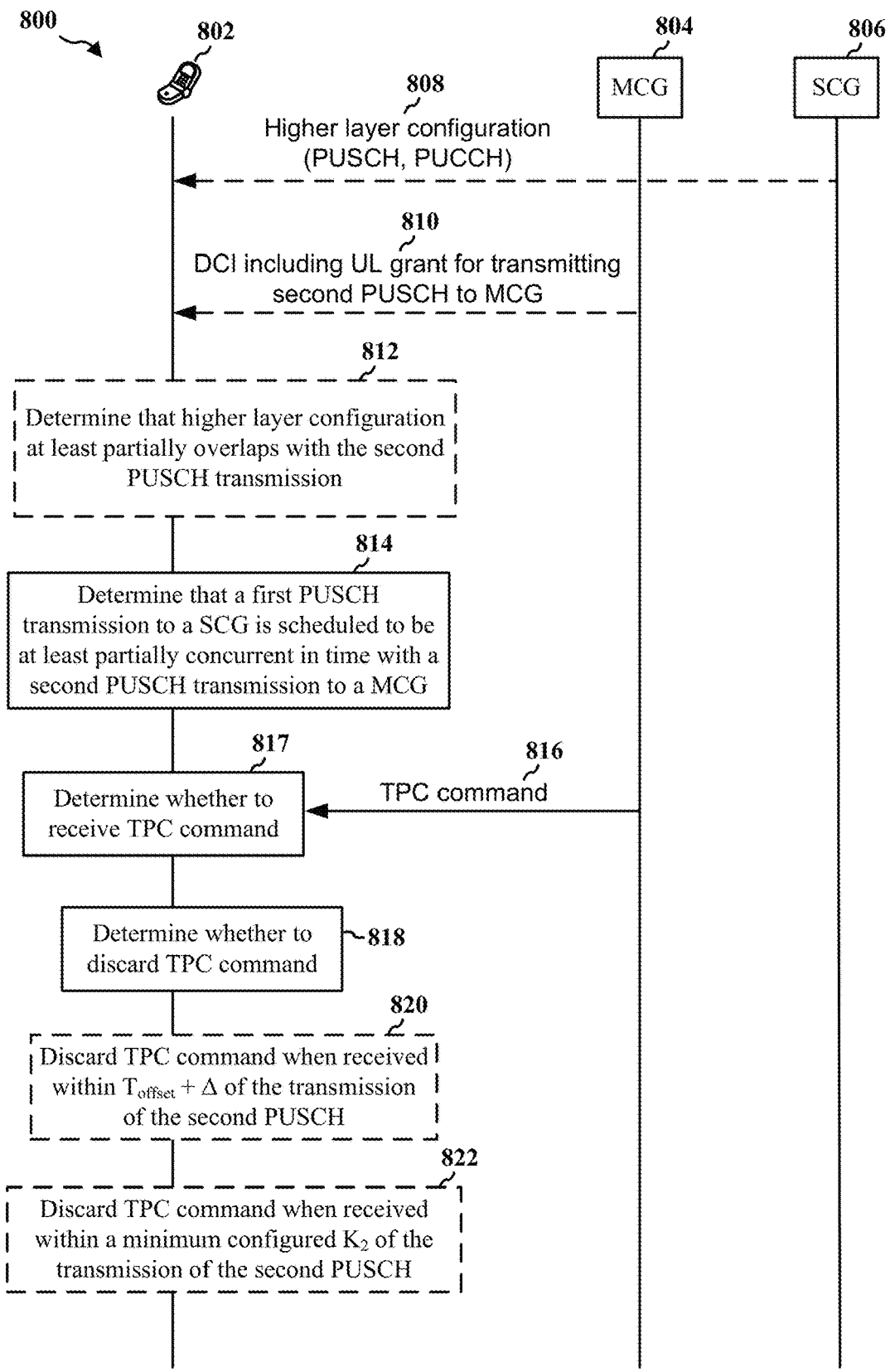
FIG. 8 is a call flow diagram of signaling between a UE, an MCG, and an SCG in accordance with certain aspects of the disclosure.

FIG. 8 is a call flow diagram 800 between a UE 802, an MCG 804, and an SCG 806. Optional aspects are illustrated with a dashed line. The MCG 804 and/or the SCG 806 may provide a cell serving UE 802. For example, in the context of FIG. 1, the MCG 804 or the SCG 806 may correspond to the base station 102/180 and, accordingly, the cell may include a geographic coverage area 110 in which communication coverage is provided and/or small cell 102' having a coverage area 110'. Further, the UE 802 may correspond to at least UE 104. In another example, in the context of FIG. 3, the MCG 804 or SCG 806 may correspond to the base station 310 and the UE 802 may correspond to the UE 350.

As illustrated in FIG. 8, the UE 802 may receive a higher layer configuration 808 from an SCG 806. The higher layer configuration may configure a transmission, from the UE, to the SCG. The UE 802 may also receive a DCI 810 from an MCG 804. The DCI 810 may include an uplink grant for transmitting a second PUSCH to the MCG 804.

In some aspects, for example as illustrated at 812, the UE 802 may determine that the higher layer configuration 808 for configuring the transmission to the SCG 806 at least partially overlaps, in time, with the second PUSCH transmission configured by DCI 810. The UE 802 may determine that the higher layer configuration 808 at least partially overlaps, in time, with the second PUSCH transmission based on the received higher layer configuration 808 and the DCI 810. In some aspects, the higher layer configuration may include at least one of a configured grant PUSCH, a PUCCH for periodic CSI, or a PUCCH for periodic SRS. The higher layer configuration may be received via RRC signaling.

At 814, the UE 802 may determine that a first PUSCH transmission may be scheduled to be at least partially concurrent in time with the second PUSCH transmission. The first PUSCH transmission may correspond to the SCG 806, while the second PUSCH transmission may correspond to the MCG 804. The UE 802 may determine that the higher layer configuration 808 at least partially overlaps with the second PUSCH transmission based on the determination that the first PUSCH transmission is scheduled to be at least partially concurrent in time with the second PUSCH transmission.

In some aspects, for example as illustrated at 816, the MCG 804 may transmit a TCP command to the UE 802. The UE 802, at 817, may determine whether to receive the TPC command from the MCG 804. The UE 802 may receive the TPC command or may not receive the TPC command from the MCG 804. The TPC command 816 may be associated with the transmission of the second PUSCH to the SCG 806. In some aspects, to determine whether to receive the TPC command, the UE may determine if the DCI is received within a period that is less than $T_{offset}$ before the first PUSCH transmission occasion on the SCG, if the second PUSCH transmission on the MCG overlaps with the first PUSCH transmission on the SCG. In some aspects, the TPC command 816 may be received, by the UE 802, in a DCI format 2_2 or DCI format 2_3 message.

As illustrated at 818, the UE 802 may determine whether to discard the TPC command 816. The UE 802 may determine whether to discard the TPC command 816 based on when the TPC command is received. For example, in some instances, the UE 802 may discard the TPC command if the TPC command is received in a period that is less than $T_{offset}$ before the first PUSCH transmission occasion on the SCG, if the second PUSCH transmission on the MCG overlaps with the first PUSCH transmission on the SCG. In such instances, the UE 802 may discard the TPC command, such that the TPC command is not applied.

In some aspects, for example as illustrated at 820, the UE 802 may discard the TPC command 816. For example, the UE 802 may discard the TPC command 816 if the TPC command is received within $T_{offset}+\Delta$ of the transmission of the second PUSCH. The $T_{offset}$ may be associated with a maximum of minimum processing times of the UE 802, while $\Delta$ may be a number of symbols as a function of a subcarrier spacing for the transmission of the second PUSCH. In some aspects, a discarded TPC command 816 may not be included in a power control for the second PUSCH transmission to the MCG 804. In some aspects, the discarded TPC command 816 may be included in a power control for a subsequent PUSCH transmission to the MCG 804, where the subsequent PUSCH transmission to the MCG 804 may be after the second PUSCH transmission to the MCG 804.

In some aspects, for example as illustrated at 822, the UE 802 may discard the TPC command 816. For example, the UE 802 may discard the TPC command 816 if the TPC command is received within a minimum configured $K_2$ of the transmission of the second PUSCH. The minimum configured $K_2$ may be a minimum number of slots between a DCI (e.g., 810) and a PUSCH transmission configured in a PUSCH time domain resource allocation in the UE specific PUSCH configuration. In some aspects, the discarded TPC command may not be included in a power control for the second PUSCH transmission to the MCG. In some aspects, the discarded TPC command 816 may be included in the power control for a subsequent PUSCH transmission to the MCG 804, where the subsequent PUSCH transmission to the MCG 804 may be after the second PUSCH transmission to the MCG 804.

Figure 9:
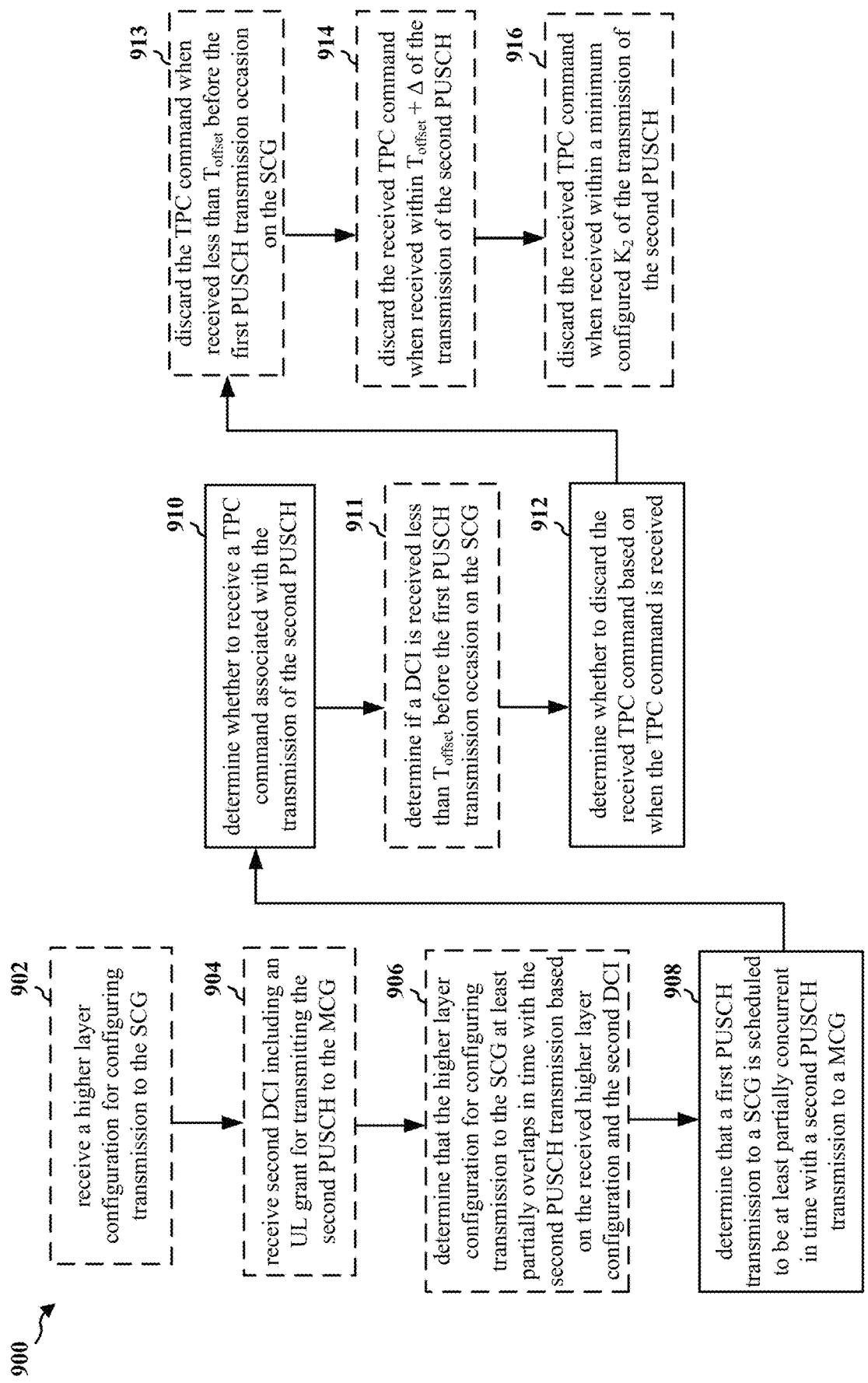
FIG. 9 is a flowchart of a method of wireless communication.

FIG. 9 is a flowchart 900 of a method of wireless communication. The method may be performed by a UE or a component of a UE (e.g., the UE 104, 802; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may enable a UE to discard a TPC command for the MCG if there is an overlapping SCG transmission.

In some aspects, for example at 902, the UE may receive a higher layer configuration. For example, 902 may be performed by configuration component 1040 of apparatus 1002. The UE may receive the higher layer configuration for configuring a transmission to an SCG.

In some aspects, for example at 904, the UE may receive a second DCI including an uplink grant. For example, 904 may be performed by grant component 1042 of apparatus 1002. The second DCI may include an uplink grant for transmitting a second PUSCH to an MCG.

In some aspects, for example at 906, the UE may determine that the higher layer configuration for configuring the transmission to the SCG at least partially overlaps in time with the second PUSCH transmission. For example, 906 may be performed by determination component 1044 of apparatus 1002. The UE may determine that the higher layer configuration at least partially overlaps with the second PUSCH transmission based on the received higher layer configuration and the second DCI. In some aspects, the higher layer configuration may include at least one of a configured grant PUSCH, a PUCCH for periodic CSI, or a PUCCH for periodic SRS. The higher layer configuration may be received via RRC signaling.

At 908, the UE may determine that a first PUSCH transmission is scheduled to be at least partially concurrent in time with a second PUSCH transmission. For example, 908 may be performed by determination component 1044 of apparatus 1002. The first PUSCH transmission may correspond to an SCG. The second PUSCH transmission may correspond to an MCG. The UE may determine that the higher layer configuration at least partially overlaps with the second PUSCH transmission based on the determination that the first PUSCH transmission is scheduled to be at least partially concurrent in time with the second PUSCH transmission.

At 910, the UE may determine whether to receive a TPC command. For example, 910 may be performed by determination component 1044 of apparatus 1002. In some aspects, the UE may receive the TPC command or may not receive the TPC command from the MCG. The TPC command may be associated with the transmission of the second PUSCH to the SCG. In some aspects, the TPC command may be received, by the UE, in a DCI format 2_2 or DCI format 2_3 message.

In some aspects, for example at 911, the UE may determine if the DCI is received within a period that is less that $T_{offset}$ before the first PUSCH transmission occasion on the SCG. For example, 911 may be performed by determination component 1044 of apparatus 1002. The UE may determine if the DCI is received within the period that is less that $T_{offset}$ before the first PUSCH transmission occasion on the SCG, if the second PUSCH transmission to the MCG overlaps with the first PUSCH transmission on the SCG. The UE may determine if the DCI is received within the period that is less that $T_{offset}$ before the first PUSCH transmission occasion on the SCG, to determine whether to receive the TPC command.

At 912, the UE may determine whether to discard the TPC command. For example, 912 may be performed by determination component 1044 of apparatus 1002. The UE may determine whether to discard the TPC command based on when the TPC command is received.

In some aspects, for example at 913, the UE may discard the TPC command if received less than $T_{offset}$ before the first PUSCH transmission occasion on the SCG. For example, 913 may be performed by discard component 1046 of apparatus 1002. The UE may discard the TPC command if received less than $T_{offset}$ before the first PUSCH transmission occasion on the SCG, if the second PUSCH transmission on the MCG overlaps with the first PUSCH transmission on the SCG. In such instances, the UE may discard the TPC command, such that the TPC command is not applied.

In some aspects, for example at 914, the UE may discard the TPC command. For example, 914 may be performed by discard component 1046 of apparatus 1002. The UE may discard the TPC command if received within $T_{offset}+\Delta$ of the transmission of the second PUSCH. The $T_{offset}$ may be associated with a maximum of minimum processing times of the UE, while $\Delta$ may be a number of symbols as a function of a subcarrier spacing for the transmission of the second PUSCH. In some aspects, a discarded TPC command may not be included in a power control for the second PUSCH transmission to the MCG. In some aspects, the discarded TPC command may be included in a power control for a subsequent PUSCH transmission to the MCG, where the subsequent PUSCH transmission to the MCG may be after the second PUSCH transmission to the MCG.

In some aspects, for example at 916, the UE may discard the TPC command. For example, 916 may be performed by discard component 1046 of apparatus 1002. The UE may discard the TPC command if received within a minimum configured $K_2$ of the transmission of the second PUSCH. The minimum configured $K_2$ may be a minimum number of slots between a DCI and a PUSCH transmission configured in a PUSCH time domain resource allocation in the UE specific PUSCH configuration. In some aspects, the discarded TPC command may not be included in a power control for the second PUSCH transmission to the MCG. In some aspects, the discarded TPC command may be included in a power control for a subsequent PUSCH transmission to the MCG, where the subsequent PUSCH transmission to the MCG may be after the second PUSCH transmission to the MCG.

Figure 10:
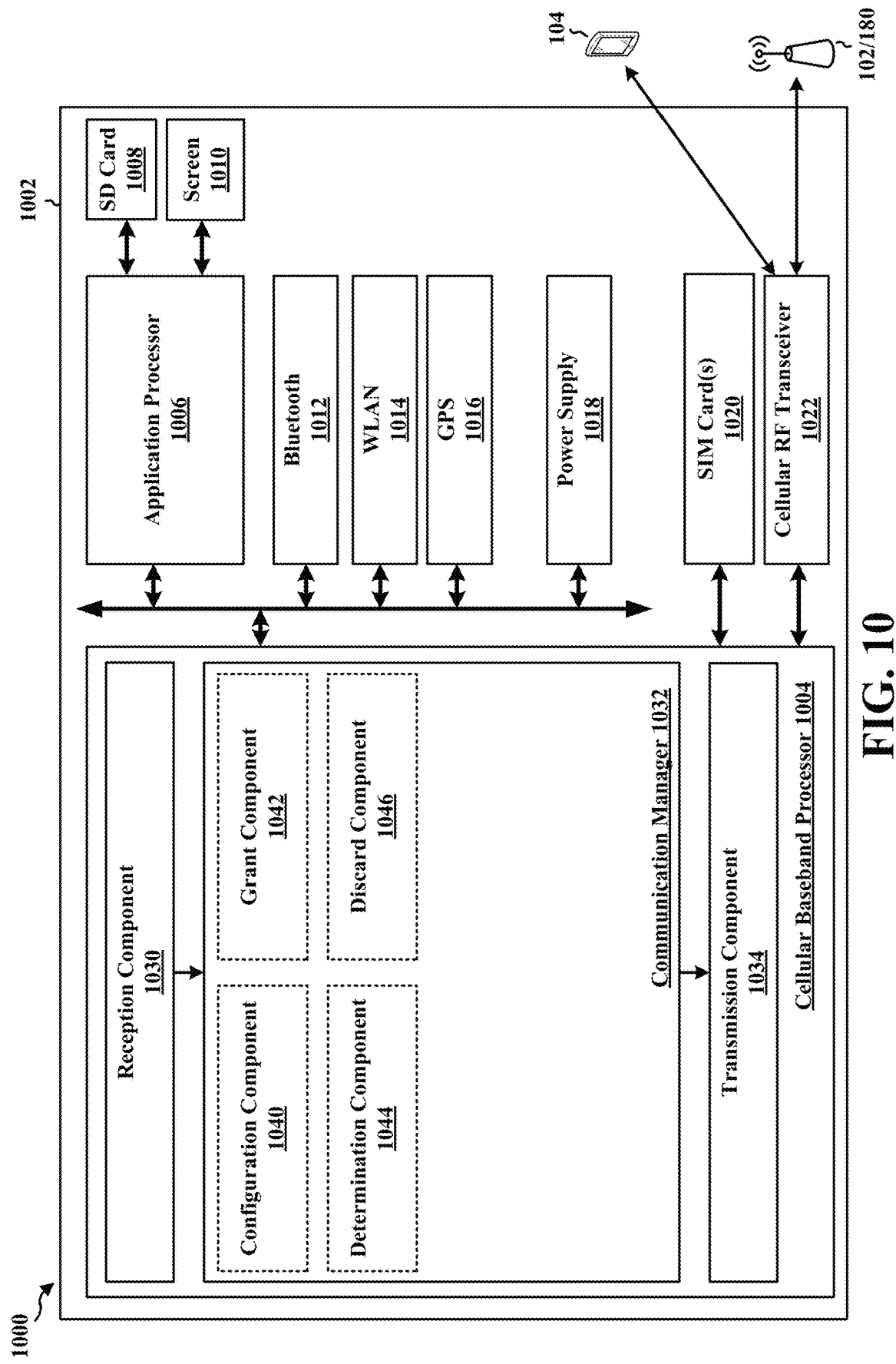
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the aforediscussed additional modules of the apparatus 1002.

The communication manager 1032 includes a configuration component 1040 that is configured to receive a higher layer configuration, e.g., as described in connection with 902 of FIG. 9. The communication manager 1032 further includes a grant component 1042 that is configured to receive a second DCI including an uplink grant, e.g., as described in connection with 904 of FIG. 9. The communication manager 1032 further includes a determination component 1044 that is configured to determine that the higher layer configuration for configuring the transmission to the SCG at least partially overlaps in time with the second PUSCH transmission, e.g., as described in connection with 906 of FIG. 9. The determination component 1044 may be configured to determine that a first PUSCH transmission is scheduled to be at least partially concurrent in time with a second PUSCH transmission, e.g., as described in connection with 908 of FIG. 9. The determination component 1004 may be configured to determine whether to receive a TPC command, e.g., as described in connection with 910 of FIG. 9. The determination component 1004 may be configured to determine if the DCI is received within a period that is less that $T_{offset}$ before the first PUSCH transmission occasion on the SCG, e.g., as described in connection with 911 of FIG.

9. The determination component 1004 may be configured to determine whether to discard the TPC command, e.g., as described in connection with 912 of FIG. 9. The communication manager 1032 further includes a discard component 1046 that is configured to discard the TPC command if received less than $T_{offset}$ before the first PUSCH transmission occasion on the SCG, e.g., as described in connection with 913 of FIG. 9. The discard component 1046 may be configured to discard the TPC command, e.g., as described in connection with 914 of FIG. 9. The discard component 1046 may be configured to discard the TPC command, e.g., as described in connection with 916 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for determining that a first PUSCH transmission to a SCG is scheduled to be at least partially concurrent in time with a second PUSCH transmission to a MCG. The apparatus includes means for determining whether to receive a TPC command associated with the transmission of the second PUSCH. The apparatus includes means for determining whether to discard the TPC command based on when the TPC command is received. The means for determining that the first PUSCH transmission to the SCG is scheduled to be at least partially concurrent in time with the second PUSCH transmission to the MCG is configured to receive a higher layer configuration for configuring transmission to the SCG. The means for determining that the first PUSCH transmission to the SCG is scheduled to be at least partially concurrent in time with the second PUSCH transmission to the MCG is configured to receive second DCI including an UL grant for transmitting the second PUSCH to the MCG. The means for determining that the first PUSCH transmission to the SCG is scheduled to be at least partially concurrent in time with the second PUSCH transmission to the MCG is configured to determine that the higher layer configuration for configuring transmission to the SCG at least partially overlaps in time with the second PUSCH transmission based on the received higher layer configuration and the second DCI. The apparatus further includes means for discarding the TPC command when received within $T_{offset}+\Delta$ of the transmission of the second PUSCH, where $T_{offset}$ is associated with a maximum of minimum processing times of the UE and $\Delta$ is a number of symbols as a function of a subcarrier spacing for the transmission of the second PUSCH. The apparatus further includes means for discarding the TPC command when received within a minimum configured $K_2$ of the transmission of the second PUSCH, where the minimum configured $K_2$ is a minimum number of slots between a DCI and a PUSCH transmission configured in a PUSCH time domain resource allocation in the UE specific PUSCH configuration. The means for determining whether to receive the TPC command is configured to determine if a DCI is received less than $T_{offset}$ before the first PUSCH transmission occasion on the SCG, if the second PUSCH transmission on the MCG overlaps with the first PUSCH transmission on the SCG. The apparatus further includes means for discarding the TPC command when received less than $T_{offset}$ before the first PUSCH transmission occasion on the SCG, if the second PUSCH transmission on the MCG overlaps with the first PUSCH transmission on the SCG, wherein the TCP command is not applied. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication of a UE comprising determining that a first PUSCH transmission to a SCG is scheduled to be at least partially concurrent in time with a second PUSCH transmission to an MCG; determining whether to receive a TPC command associated with the transmission of the second PUSCH; and determining whether to discard the TPC command based on when the TPC command is received.

In Aspect 2, the method of Aspect 1 further includes that the determining that the first PUSCH transmission is scheduled to be at least partially concurrent in time with the second PUSCH transmission further includes receiving a higher layer configuration for configuring transmission to the SCG; receiving second DCI including an UL grant for transmitting the second PUSCH to the MCG; and determining that the higher layer configuration for configuring transmission to the SCG at least partially overlaps in time with the second PUSCH transmission based on the received higher layer configuration and the second DCI.

In Aspect 3, the method of Aspect 1 or 2 further includes that the higher layer configuration includes at least one of a configured grant PUSCH, a PUCCH for periodic CSI, or a PUCCH for periodic SRS, wherein the higher layer configuration is received via RRC message.

In Aspect 4, the method of any of Aspects 1-3 further includes discarding the TPC command when received within $T_{offset}+\Delta$ of the transmission of the second PUSCH, where $T_{offset}$ is associated with a maximum of minimum processing times of the UE and $\Delta$ is a number of symbols as a function of a subcarrier spacing for the transmission of the second PUSCH.

In Aspect 5, the method of any of Aspects 1-4 further includes that a discarded TPC command is not included in a power control for the second PUSCH transmission to the MCG.

In Aspect 6, the method of any of Aspects 1-5 further includes that the discarded TPC command is included in a power control for a subsequent PUSCH transmission to the MCG after the second PUSCH transmission to the MCG.

In Aspect 7, the method of any of Aspects 1-6 further includes discarding the TPC command when received within a minimum configured $K_2$ of the transmission of the second PUSCH, where the minimum configured $K_2$ is a minimum number of slots between a DCI and a PUSCH transmission configured in a PUSCH time domain resource allocation in the UE specific PUSCH configuration.

In Aspect 8, the method of any of Aspects 1-7 further includes that a discarded TPC command is not included in a power control for the second PUSCH transmission to the MCG.

In Aspect 9, the method of any of Aspects 1-8 further includes that a discarded TPC command is included in a power control for a subsequent PUSCH transmission to the MCG after the second PUSCH transmission to the MCG.

In Aspect 10, the method of any of Aspects 1-9 further includes that the TPC command is received in a DCI format 2_2 or DCI format 2_3 message.

In Aspect 11, the method of any of Aspects 1-10 further includes that the determining whether to receive the TPC command associated with the transmission of the second PUSCH further includes determining if a DCI is received less than $T_{offset}$ before the first PUSCH transmission occasion on the SCG, if the second PUSCH transmission on the MCG overlaps with the first PUSCH transmission on the SCG.

In Aspect 12, the method of any of Aspects 1-11 further includes discarding the TPC command when received less than $T_{offset}$ before the first PUSCH transmission occasion on the SCG, if the second PUSCH transmission on the MCG overlaps with the first PUSCH transmission on the SCG, wherein the TCP command is not applied.

Aspect 13 is a device including one or more processors and one or more memories in electronic communication with the one or more processors and storing instructions executable by the one or more processors to cause the device to implement a method as in any of Aspects 1-12.

Aspect 14 is a system or apparatus including means for implementing a method or realizing an apparatus as in any of Aspects 1-12.

Aspect 15 is a non-transitory computer readable storage medium storing instructions executable by one or more processors to cause the one or more processors to implement a method as in any of Aspect 1-12.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining that a first physical uplink shared channel (PUSCH) transmission to a secondary cell group (SCG) is scheduled to be at least partially concurrent in time with a second PUSCH transmission to a master cell group (MCG), wherein the determining that the first PUSCH transmission is scheduled to be at least partially concurrent in time with the second PUSCH transmission comprises:
      receiving a higher layer configuration for configuring transmission to the SCG;
      receiving downlink control information (DCI) including an uplink (UL) grant for transmitting the second PUSCH to the MCG; and
      determining that the higher layer configuration for configuring transmission to the SCG at least partially overlaps in time with the second PUSCH transmission based on the received higher layer configuration and the DCI;
   receiving a transmission power control (TPC) command associated with transmission of the second PUSCH; and
   determining whether to discard the TPC command based on when the TPC command is received.

2. The method of claim 1, wherein the higher layer configuration includes at least one of a configured grant PUSCH, a physical uplink control channel (PUCCH) for periodic channel state indicator (CSI), or a PUCCH for periodic sounding reference signals (SRS), wherein the higher layer configuration is received via radio resource control (RRC) message.

3. The method of claim 1, further comprising:
   discarding the TPC command when received within $T_{offset}+\Delta$ of the transmission of the second PUSCH, where $T_{offset}$ is associated with a maximum of minimum processing times of the UE and $\Delta$ is a number of symbols as a function of a subcarrier spacing for the transmission of the second PUSCH.

4. The method of claim 3, wherein a discarded TPC command is not included in a power control for the second PUSCH transmission to the MCG.

5. The method of claim 3, wherein the discarded TPC command is included in a power control for a subsequent PUSCH transmission to the MCG after the second PUSCH transmission to the MCG.

6. The method of claim 1, further comprising:
discarding the TPC command when received within a minimum configured $K_2$ of the transmission of the second PUSCH, where the minimum configured $K_2$ is a minimum number of slots between a DCI and a PUSCH transmission configured in a PUSCH time domain resource allocation in a UE specific PUSCH configuration.

7. The method of claim 6, wherein a discarded TPC command is not included in a power control for the second PUSCH transmission to the MCG.

8. The method of claim 6, wherein a discarded TPC command is included in a power control for a subsequent PUSCH transmission to the MCG after the second PUSCH transmission to the MCG.

9. The method of claim 1, wherein the TPC command is received in a DCI format 2_2 or DCI format 2_3 message.

10. The method of claim 1, wherein the receiving the TPC command associated with the transmission of the second PUSCH comprises:
determining if a DCI is received less than $T_{offset}$ before a first PUSCH transmission occasion on the SCG, if the second PUSCH transmission on the MCG overlaps with the first PUSCH transmission on the SCG.

11. The method of claim 1, further comprising:
discarding the TPC command when received less than $T_{offset}$ before a first PUSCH transmission occasion on the SCG, if the second PUSCH transmission on the MCG overlaps with the first PUSCH transmission on the SCG, wherein the TCP command is not applied.

12. An apparatus for wireless communication of a user equipment (UE), comprising:
a memory; and
at least one processor coupled to the memory and configured to:
determine that a first physical uplink shared channel (PUSCH) transmission to a secondary cell group (SCG) is scheduled to be at least partially concurrent in time with a second PUSCH transmission to a master cell group (MCG), wherein the at least one processor configured to determine that the first PUSCH transmission is scheduled to be at least partially concurrent in time with the second PUSCH transmission comprises the at least one processor configured to:
receive a higher layer configuration for configuring transmission to the SCG;
receive downlink control information (DCI) including an uplink (UL) grant for transmitting the second PUSCH to the MCG; and
determine that the higher layer configuration for configuring transmission to the SCG at least partially overlaps in time with the second PUSCH transmission based on the received higher layer configuration and the DCI;
receive a transmission power control (TPC) command associated with the transmission of the second PUSCH; and
determine whether to discard the TPC command based on when the TPC command is received.

13. The apparatus of claim 12, wherein the higher layer configuration includes at least one of a configured grant PUSCH, a physical uplink control channel (PUCCH) for periodic channel state indicator (CSI), or a PUCCH for periodic sounding reference signals (SRS), wherein the higher layer configuration is received via radio resource control (RRC) message.

14. The apparatus of claim 12, wherein the at least one processor is configured to:
discard the TPC command when received within $T_{offset}+\Delta$ of the transmission of the second PUSCH, where $T_{offset}$ is associated with a maximum of minimum processing times of the UE and $\Delta$ is a number of symbols as a function of a subcarrier spacing for the transmission of the second PUSCH.

15. The apparatus of claim 14, wherein a discarded TPC command is not included in a power control for the second PUSCH transmission to the MCG.

16. The apparatus of claim 14, wherein the discarded TPC command is included in a power control for a subsequent PUSCH transmission to the MCG after the second PUSCH transmission to the MCG.

17. The apparatus of claim 12, wherein the at least one processor is configured to:
discard the TPC command when received within a minimum configured $K_2$ of the transmission of the second PUSCH, where the minimum configured $K_2$ is a minimum number of slots between a DCI and a PUSCH transmission configured in a PUSCH time domain resource allocation in a UE specific PUSCH configuration.

18. The apparatus of claim 17, wherein a discarded TPC command is not included in a power control for the second PUSCH transmission to the MCG, wherein a discarded TPC command is included in a power control for a subsequent PUSCH transmission to the MCG after the second PUSCH transmission to the MCG.

19. The apparatus of claim 12, wherein the TPC command is received in a DCI format 2_2 or DCI format 2_3 message.

20. The apparatus of claim 12, wherein to receive the TPC command associated with the transmission of the second PUSCH comprises, the at least one processor is configured to:
determine if a DCI is received less than $T_{offset}$ before the first PUSCH transmission occasion on the SCG, if the second PUSCH transmission on the MCG overlaps with a first PUSCH transmission on the SCG.

21. The apparatus of claim 12, wherein the at least one processor is configured to:
discard the TPC command when received less than $T_{offset}$ before the first PUSCH transmission occasion on the SCG, if the second PUSCH transmission on the MCG overlaps with a first PUSCH transmission on the SCG, wherein the TCP command is not applied.

22. An apparatus for wireless communication of a user equipment (UE), comprising:
means for determining that a first physical uplink shared channel (PUSCH) transmission to a secondary cell group (SCG) is scheduled to be at least partially concurrent in time with a second PUSCH transmission to a master cell group (MCG), wherein the means for determining that the first PUSCH transmission is scheduled to be at least partially concurrent in time with the second PUSCH transmission is configured to:
receive a higher layer configuration for configuring transmission to the SCG;
receive downlink control information (DCI) including an uplink (UL) grant for transmitting the second PUSCH to the MCG; and
determine that the higher layer configuration for configuring transmission to the SCG at least partially overlaps in time with the second PUSCH transmission based on the received higher layer configuration and the DCI;

means for receiving a transmission power control (TPC) command associated with the transmission of the second PUSCH; and means for determining whether to discard the TPC command based on when the TPC command is received.

23. The apparatus of claim 22, further comprising:

means for discarding the TPC command when received within $T_{offset}+\Delta$ of the transmission of the second PUSCH, where $T_{offset}$ is associated with a maximum of minimum processing times of the UE and $\Delta$ is a number of symbols as a function of a subcarrier spacing for the transmission of the second PUSCH.

24. The apparatus of claim 22, further comprising:

means for discarding the TPC command when received within a minimum configured $K_2$ of the transmission of the second PUSCH, where the minimum configured $K_2$ is a minimum number of slots between a DCI and a PUSCH transmission configured in a PUSCH time domain resource allocation in a UE specific PUSCH configuration.

25. The apparatus of claim 22, wherein the means for receiving the TPC command associated with the transmission of the second PUSCH is configured to:

determine if a DCI is received less than $T_{offset}$ before a first PUSCH transmission occasion on the SCG, if the second PUSCH transmission on the MCG overlaps with the first PUSCH transmission on the SCG.

26. The apparatus of claim 22, further comprising:

means for discarding the TPC command when received less than $T_{offset}$ before a first PUSCH transmission occasion on the SCG, if the second PUSCH transmission on the MCG overlaps with the first PUSCH transmission on the SCG, wherein the TCP command is not applied.

27. A non-transitory computer-readable medium storing computer executable code, the code when executed by a processor cause the processor to:

determine that a first physical uplink shared channel (PUSCH) transmission to a secondary cell group (SCG) is scheduled to be at least partially concurrent in time with a second PUSCH transmission to a master cell group (MCG), wherein the code to determine that the first PUSCH transmission is scheduled to be at least partially concurrent in time with the second PUSCH transmission cause the processor to:

receive a higher layer configuration for configuring transmission to the SCG;

receive downlink control information (DCI) including an uplink (UL) grant for transmitting the second PUSCH to the MCG; and determine that the higher layer configuration for configuring transmission to the SCG at least partially overlaps in time with the second PUSCH transmission based on the received higher layer configuration and the DCI;

receive a transmission power control (TPC) command associated with the transmission of the second PUSCH; and determine whether to discard the TPC command based on when the TPC command is received.

* * * * *